United States Patent
Ainsworth

[15] 3,668,429
[45] June 6, 1972

[54] SENSE AMPLIFIER LATCH FOR MONOLITHIC MEMORIES

[72] Inventor: Richard A. Ainsworth, Wappingers Falls, N.Y.
[73] Assignee: International Business Machines Corporation, Armonk, N.Y.

[22] Filed: Sept. 22, 1970
[21] Appl. No.: 74,433

[52] U.S. Cl. ..............................307/235, 307/237, 307/310, 328/115, 330/20, 330/30 D
[51] Int. Cl. ..........................................................H03k 5/20
[58] Field of Search ..................307/310, 235, 237; 328/115, 328/150; 330/30 D, 69, 20

[56] References Cited

UNITED STATES PATENTS 3,452,223 6/1969 Pappas..................................307/310
3,588,535 6/1971 Hellstrum..............................307/310

*Primary Examiner*—Rudolph V. Rolinec
*Assistant Examiner*—David M. Carter
*Attorney*—Hanifin and Jancin and Theodore E. Galanthay

[57] ABSTRACT

A sense amplifier latching circuit for accepting signals from a monolithic memory array. The input signal from the monolithic memory is amplified, the logical sense of the input is determined and held in the latch, and the signal is translated down to current switch logic circuit levels having a capability for large fan-out and fan-in (dot or). The input to the sense amplifier latch has a grounded base clamp providing a very low impedance input in the presence of bi-polar noise current. The sense amplifier latch circuit further includes threshold tracking, temperature compensating, and power supply compensating circuits. The entire circuit includes emitter follower and grounded base circuits providing a high band width resulting in fast rise-time and low propagation delay.

4 Claims, 9 Drawing Figures

INVENTOR
RICHARD A. AINSWORTH
BY Theodore E. Galanthay
ATTORNEY

SENSE AMPLIFIER LATCH FOR MONOLITHIC MEMORIES

CROSS-REFERENCES TO RELATED APPLICATIONS

This application is related to patent application Ser. No. 74,247 invented by J. E. Gersbach, commonly assigned and filed on the same day as the present application.

BACKGROUND OF THE INVENTION

1. Field of the Invention

This invention relates to monolithic memories and more specifically to sense amplifier and latching circuits for such monolithic memories.

2. Description of the Prior Art

The prior art abounds with numerous circuits for amplifying very small data signals in the presence of relatively large noise signals. Also, numerous circuits for latching such a signal to maintain the particular output level after the input has changed, are known. The great majority of these circuits, however, were designed for use with memories constructed from ferrite cores or the like. With the advent of monolithic memories, entirely new problems requiring entirely new solutions have arisen. Moreover, with monolithic memories it is sensible to require that the sense and latching circuitry also be integrated and many of the known prior art circuits do not lend themselves to integration. Integrated circuitry of the type contemplated herein is limited to resistors, and diodes (also fabricateable from transistors). Much of the prior art circuitry includes large capacitors, inductors, etc.

Presently known monolithic memories which have prompted the need for improved sense amplifier latch circuits include 128 or more bits per monolithic chip with four or more chips per module. Typically 24 modules are then placed on a storage card for storing 12,000 bits of information. The output of all 128 cells on a chip is bussed into a single output from the chip. The four outputs from the module are also bussed together as are each of the 24 outputs from each of the 24 modules on a storage card. In this way a storage card has a single output depending on the particular cell that was addressed. There will be an output from one of the 96 chips on the card which must be sensed, amplified, and latched while the other 95 chips are not accessed. There exists a need therefore, for a sense amplifier latching circuit having a very low input impedance for accepting one of at least such 96 outputs on a common conductor as an input. It is necessary that this input remain at a low input impedance to both positive and negative signals in the presence of bi-polar noise. What is also needed is a sense amplifier latching circuit having a high band width for fast rise-time and low propagation delay. Moreover, in a monolithic sense amplifier latching circuit there is a need for threshold tracking, temperature compensation and power supply compensation. At the time of this invention, with monolithic memories being on the verge of introduction into commerce, there is no known sense amplifier latching circuit having the foregoing necessary and desirable characteristics.

SUMMARY OF THE INVENTION

It is therefore an object of this invention to provide a sense amplifier latching circuit having a low impedance input in the presence of bi-polar noise.

It is another object of this invention to provide a high band width for a monolithic sense amplifier latching circuit.

It is a further object of this invention to provide threshold tracking, temperature compensation, and power supply compensation in a sense amplifier latching circuit.

Lastly, it is a general object of this invention to provide a sense amplifier latching circuit fabricated in monolithic technology.

In accordance with one aspect of the invention, a grounded base trans-impedance amplifier is provided. This amplifier typically includes a transistor having a grounded base and an input at its emitter. It has an inherently low input impedance when current is drawn from the emitter and the input time constant is therefore short. The high speed occasioned by the short input time constant is maintained for relatively large values of input capacitance occasioned by other connected circuitry. The low impedance input feature could be lost when noise currents of an opposite polarity exceed the signal and DC bias currents turning the trans-impedance amplifier off. In order to avoid such a high impedance situation in the event of such a noise current, a diode clamp is added to the input circuit in parallel with the trans-impedance amplifier. The additional diode reduces the recovery time because its conduction increases rapidly as the input current reverses. The diode does not conduct in the absence of noise. A low impedance input is thus obtained for a single ended signal by having the transistors in a grounded base stage partially conducting, prior to the application of a data signal, thereby providing threshold sensing of a single ended signal by inclusion of a reference current difference. The grounded base stage includes two transistors having their bases connected in common, the output being taken differentially from each of the collectors. The input is provided to the emitter of the first of these transistors. The threshold current is provided by biasing the second of the two transistors at a current level equal to the sum of the bias current in the first transistor and the desired input threshold current. In this way, the differential output voltage is zero when the input current is at its threshold value. The basic biasing method allows the use of the grounded base stage which contributes significantly to the advantage of a low input impedance.

The foregoing biasing scheme, however, is sensitive to variations in temperature and power supply voltage. For example, the level of the input current from the monolithic memory array modules will increase with temperature. It is therefore necessary that the input threshold not decrease in the presence of a temperature increase and preferably that it increase. It is a feature of this invention that the threshold increases in the presence of an increase in temperature thereby partially compensating for an increase in the input signal. An increase in the power supply voltage of the monolithic memory array module will also increase the signal input level. It is another feature of this invention that the threshold level will similarly increase thereby compensating for such an increase in the power supply of the array module.

In accordance with another aspect of this invention, the sense amplifier and latching circuit threshold is also self-compensating with respect to variations in the negative power supply. In an uncompensated circuit, the output signal would decrease and the threshold would increase as the negative power supply potential becomes more negative. In the present circuit, an additional transistor in series with a resistor at the front end of the circuit and connected to the same negative potential supply, provides a change at the input which precisely compensates for any change in the output occasioned by a variation in the negative power supply.

In accordance with still another aspect of this invention, temperature and tolerance compensation is provided. Frequently, in the process of designing monolithic circuits it becomes necessary to use strings of series diodes for level shifting and voltage referencing. These diodes have tolerances and are sensitive to temperature which limits circuit design. In order to maintain a single ended output at a constant voltage level as the temperature of the circuitry changes, additional level shifting diodes can be inserted earlier in the circuit to balance out any voltage changes due to temperature. For example, if the output of a circuit is taken from the emitter of a transistor after three stages of emitter follower connections, then the same number of series diodes connected to the base of the transistor comprising the first of the stages will tend to bias the base of the first transistor in a direction to compensate any change to the output voltage due to temperature and semiconductor voltage tolerances.

The foregoing and other objects, features and advantages of this invention will be apparent from the following more particular description of the preferred embodiment of the invention, as illustrated in the accompanying drawings.

DESCRIPTION OF THE PREFERRED EMBODIMENTS

Figure 1:
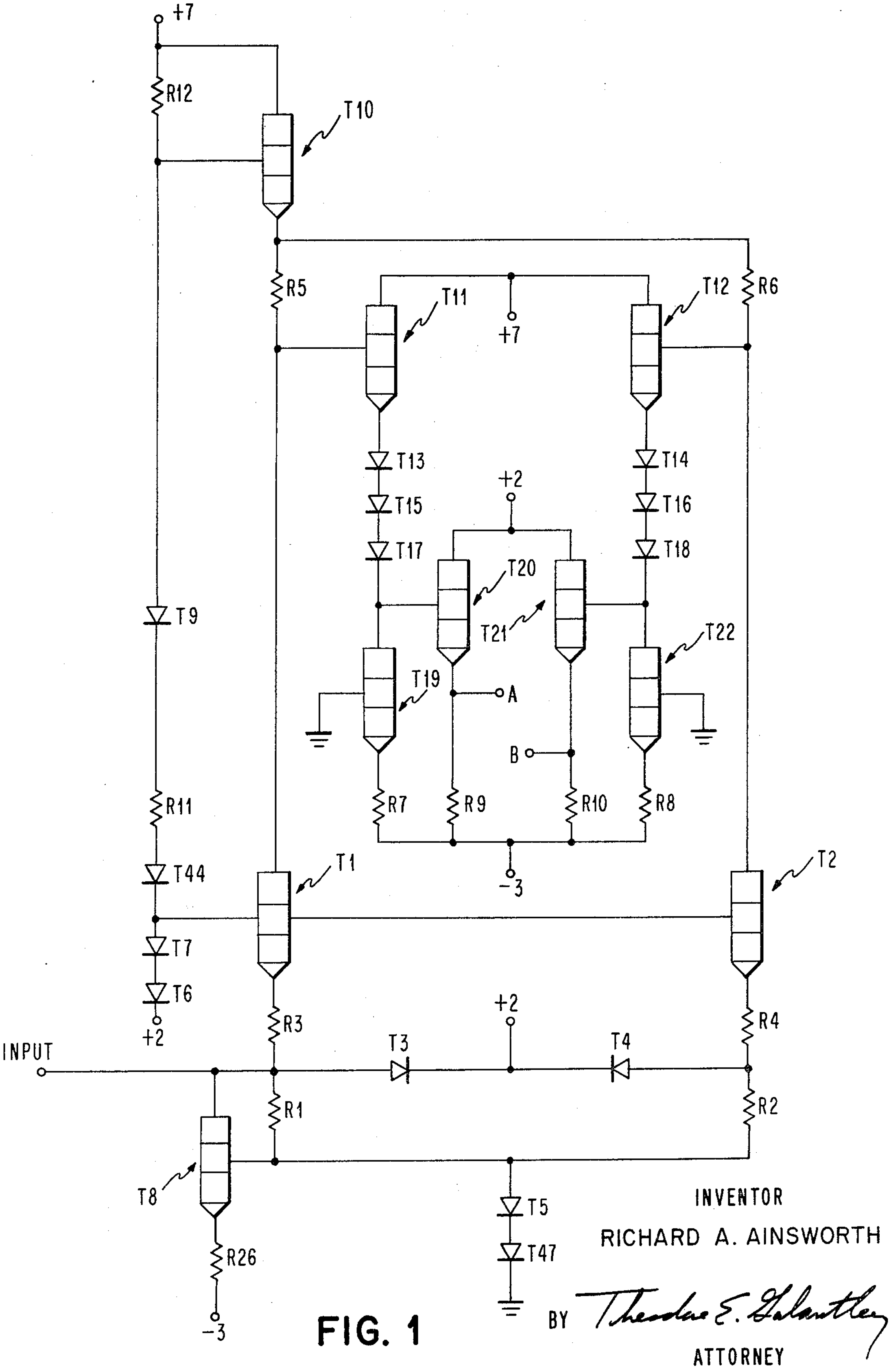
FIG. 1 is a circuit diagram depicting the amplifying stage of the sense amplifier latching circuit.

Refer now to FIG. 1 for a description of the amplifying stage of the sense amplifier latching circuit. The input which is typically a negative going signal current pulse is received at a node common to resistors R1 and R3, transistor T8 and diode T3. Note that throughout this application diodes and transistors have both been designated by T since diodes are readily fabricated from transistors by connecting the base and collector together as shown for example at T43. Also, component values for the resistors are provided in table 1. These values of resistance are exemplary and in no way intended to limit the scope of this invention. Similarly, the values of bias voltage at the various terminals are also given by way of example. With continued reference to FIG. 1, the emitter of T8 is connected to R26 which in turn is connected to a −3 volt supply. The other end of R1 is connected to the base of T8 and also connected to T5 and R2. The point between T3 and T4 is connected to the +2 supply. The other end of R3 is connected to the emitter of T1 and R4 is connected to the emitter of T2. The base of T1 is connected to the base of T2 and further through series diodes T7 and T6 is connected to the +2 supply. This same common point is connected to T44 and through the series path of R11, T9 and R12 to a +7 supply. The collector of T10 is also connected to the +7 supply while the base of T10 is connected at a point between R12 and T9. The emitter of T10 is connected T5 and R6. Note that the circuit is symmetrical. The +7 supply is connected to the collectors of T11 and T12. The base of T11 is connected to a point between R5 and the collector of T1 while the base of T12 is connected to a point between R6 and the collector of T2. The emitter of T11 is connected through a series of level shifting diodes T13, T15 and T17 to the collector of T19 and the base of T20. Similarly, the emitter of T12 is connected through a series of level shifting diodes T14, T16 and T18 to the collector of T22 and the base of T21. The collectors of T20 and T21 are connected together and to the +2 supply. The base of T19 and T22 are both connected to ground. The emitter of T19 is connected to resistor R7 which is connected to the −3 supply. Similarly, the resistors R9, R10 and R8 are connected between the −3 volt vupply and the emitters of transistors T20, T21 and T22, respectively. The output of this amplifying stage is obtained differentially at points A and B, the emitters of T20 and T21 respectively.

Figure 2:
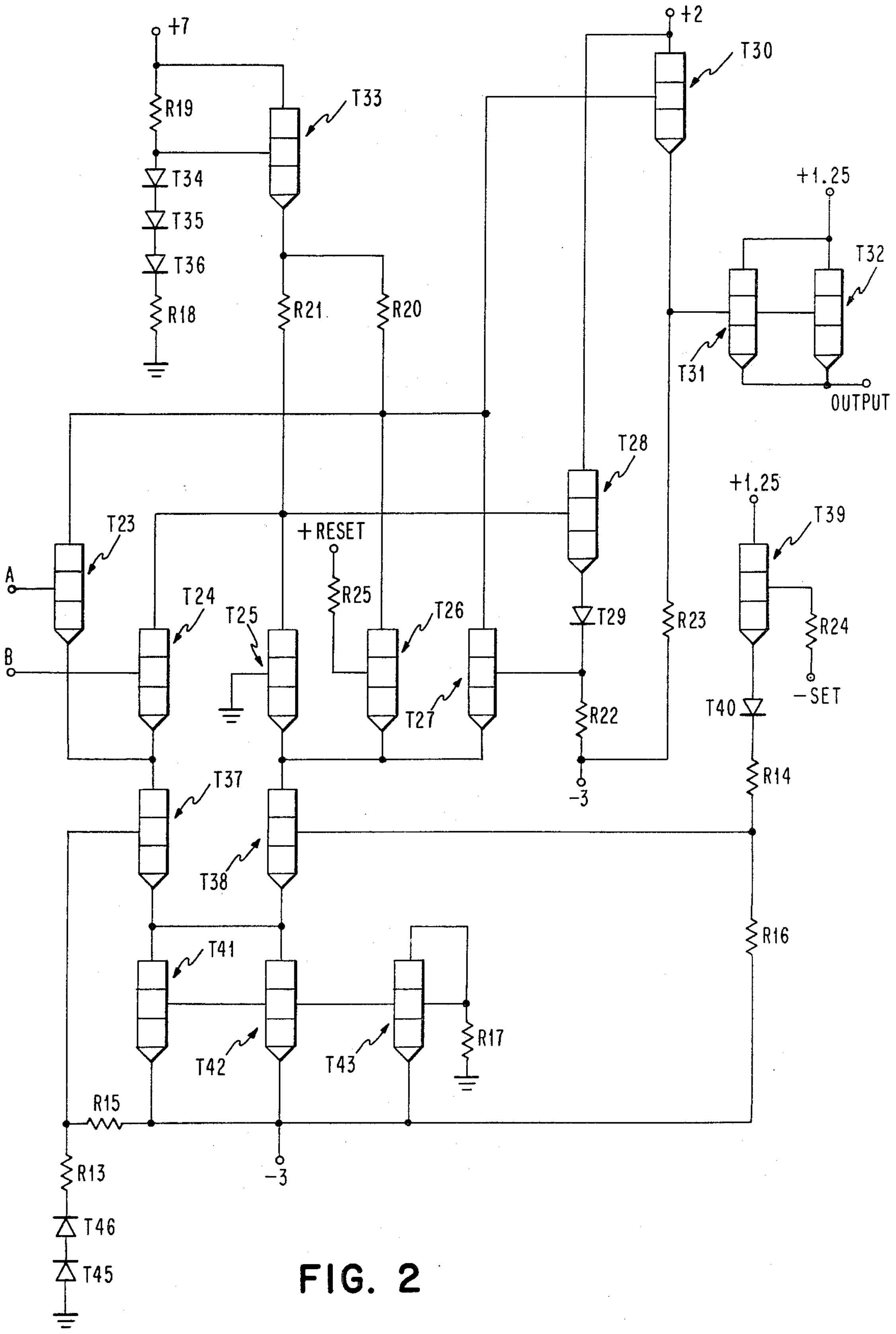
FIG. 2 is a circuit diagram depicting the latching stage of the sense amplifier latching circuit.

Refer now to FIG. 2 for a detailed description of the latching stage. The input to the latching stage is obtained at points A and B at the base of T23 and T24, respectively, points A and B corresponding to the similarly labeled output points of FIG. 1. The emitters of T23 and T24 are connected together and to the collector of T37. The emitter of T37 is connected to the emitter of T38 with which it constitutes a current switch and to the collectors of T41 and T42. The base of T37 is connected to the series path constituting R13, T46 and T45 which is connected to ground. The base of T37 is further connected to R15 which is further connected to the −3 supply. Also connected to the −3 supply are the emitters of T41, T42 and T43 which together with R17, which is connected to ground, constitute a monolithic current source. The resistor R17 is connected to the base of T41, T42, and T43 and also the collector of T43. The −3 supply is also connected to R16 which in turn is connected to the emitter of T39. The collector of T39 is connected to a +1.25 volt supply, the base of T39 being connected to R24 which is connected to the "-set" input terminal. The collector of T38 is connected to the emitters of T25, T26 and T27. The base of T25 is connected to ground while the base of T26 is connected to R25 which is connected to the re-set terminal. The base of T27 is connected to T29 and R22. The other end of R22 is connected to the −3 supply as is resistor R23. The collectors of T26 and T27 are connected together and also to the collector of T23, resistor R20 and the base of T30. The collectors of T24 and T25 are connected together and also to R21 and the base of T28. The collector of T28 is connected to the collector of T30 which is connected to the + 2 supply. The other end of R20 and R21 are connected together and the emitter of T33. The +7 supply is connected to the collector of T33 and R19. The other end of R19 is connected to the base of T33 and to the series path including T34, T35, T36 and R18 which is connected to ground. The emitter of T30 is connected to R23 and the base of T31. The collector of T31 is connected to the collector of T32 and the +1.25 volt supply. The base and emitter of T31 and T32 are connected together essentially forming the equivalent of one larger transistor in order to satisfy high current requirements. The output terminal is taken from the emitters of T31 and T32. The following is a table of exemplary resistance values:

TABLE I

| Resistor | Value |
|---|---|
| R1 | 2.0 K |
| R2 | .670 K |
| R3 | 10 ohm |
| R4 | 10 ohm |
| R5 | .3K |
| R6 | .3K |
| R7 | 1.1K |
| R8 | 1.1K |
| R9 | 1.5K |
| R10 | 1.5K |
| R11 | .38K |
| R12 | 1.52K |
| R13 | .1K |
| R14 | .1K |
| R15 | 3K |
| R16 | 3K |
| R17 | 1.0K |
| R18 | .25K |
| R19 | 2.2K |
| R20 | .25K |
| R21 | .25K |
| R22 | 3K |
| R23 | 1K |
| R24 | 20 ohm |
| R25 | 20 ohm |
| R26 | 9.3K |

OPERATION

Having described the various details of interconnection of the various components, the operation of the circuit will now be described, initially with reference to FIG. 1. In order to provide a low input impedance, a grounded base stage, including T1 and T2 is provided. Note that the base of T1 and T2 are connected together and are also connected to a source of positive potential through T7 and T6, which is the equivalent of a signal ground. A threshold at the input is established by unbalancing resistors R1 and R2. As provided in the table, R1 may typically have a value of 2K while R2 has a value of approximately 0.670K. Assume that the sense amplifier latch circuit is to be designed for a threshold current of 0.9 milliamps. Then the current through R2 should be equal to the sum of 0.9 milliamps plus the current through R1 and the collector of T8.

With the given values of resistances the current through R2 will be approximately 1.950 milliamps while the current through R1 will be approximately 0.650 milliamps. The collector current of T8 is then approximately 0.4 milliamps. Under these conditions, when the threshold current of 0.9 milliamps flows from the input node, then both emitters of transistors T1 and T2 are maintained at the same potential so that the differential output at the base of T11 and T12 must be nominally zero.

Figure 3:
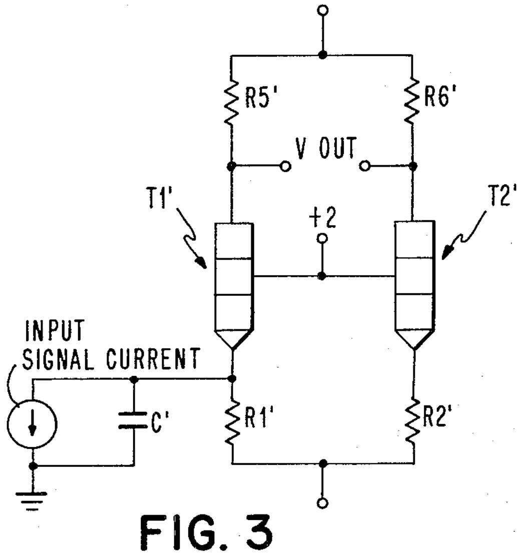
FIG. 3 is an equivalent circuit diagram particularly illustrating the grounded base stage.

Refer now to FIG. 3 for a simplified equivalent circuit showing only the essential elements of the grounded base stage. The input signal has been designated by a current source to ground and a capacitor C′ has been inserted to show the high equivalent capacitance at that point as previously described. When a monolithic array chip has been powered to its high power level but no cell has yet been accessed, 0.9 milliamps will flow in the equivalent current source. After accessing, if the cell output indicates a "0", the current will decrease to 0.2 milliamps. Such a decrease in current will reduce the current through T1′ causing a more positive output at its collector. Conversely, a "1" input will increase the signal current to 2 milliamps increasing the current through T1′ causing a negative output at the collector of T1. Thus, an output has been obtained from the collector of T1′ without a significant delay due to capacitor C′. This is due to the fact that even before an input signal is received, T1′ is already conducting in the linear region. The change in current at the input node occasioned by the occurrence of a " 1" or "0" will change the potential at the input node by only approximately 18 millivolts. In the corresponding portion of the circuit of FIG. 1, the corresponding voltage drop is approximately 27 millivolts because of the small additional drop across R3.

Figure 4:
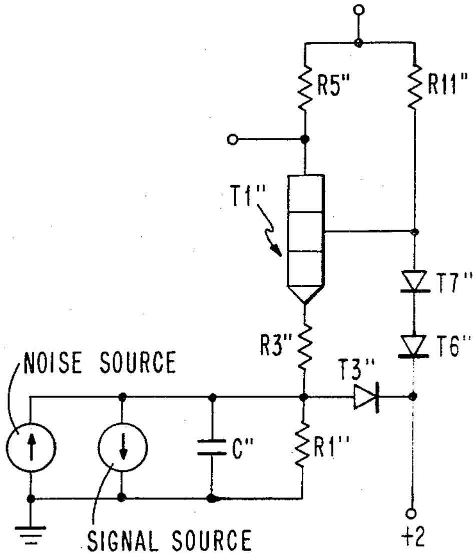
FIG. 4 is an equivalent circuit diagram particularly illustrating the input clamp for the grounded base transistor.

The circuit of FIG. 3 operates as a low impedance input to the sense amplifier in the absence of positive noise current. However, at the occurrence of positive noise currents of amplitude exceeding the signal current and DC bias current, T1′ would be turned off, thereby becoming an extremely high impedance. The recovery time of T1 becomes extremely long and the advantages of a low impedance input are lost. In order to provide a low impedance input in the presence of such bipolar noise, clamping diode T3″ as shown in FIG. 4 is provided. With continued reference to FIG. 4, note that the noise current has been indicated by a current source of polarity opposite to that of the signal source. All corresponding components are again numbered similar to their counterparts in FIG. 1 but with a double prime for purposes of specific identification. For example, T3 corresponds to T3″. The diodes used in this circuit have a forward current drop of approximately 750 millivolts at 25° C. Thus, as long as the potential at the input remains less than 2.75 volts, T3 will not significantly conduct. With the present values given when the signal source is at 0.9 milliamps and in the absence of noise the input node is at approximately 2.71 volts which is insufficient to cause T3 to conduct, significantly. In the presence of a positive noise current, however, T3 will conduct and clamp the input node to approximately 2.75 volts maintaining a low input time constant. T3 has been constructed to have a somewhat larger junction voltage drop from that of T1″, T7″ and T6″, to further reduce T3's conduction in the absence of noise currents. Good matching of junction voltages is not necessary but does reduce the input voltage excursion in the presence of noise, thereby shortening the recovery time after the noise has disappeared. It will be obvious to those skilled in the art that this low impedance input stage including the grounded base amplifier and diode clamp have applications in all types of sense amplifier and latch circuits and other circuits which may differ significantly from that shown in the present FIG. 1 and FIG. 2.

Figure 9:
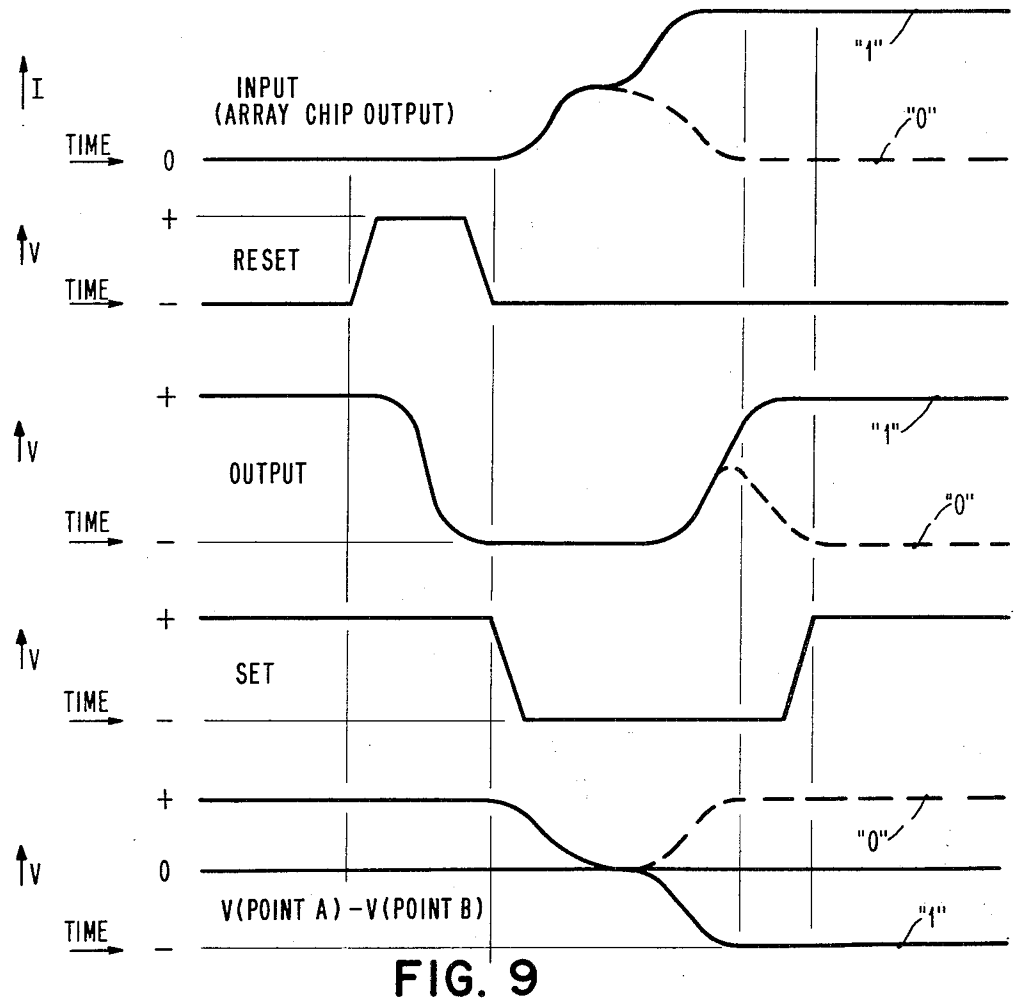
FIG. 9 is a series of typical waveform diagrams illustrating the over-all operation.

Referring now to FIGS. 1 and 2 and also FIG. 9, the overall operation of the circuit will be described. Assume that the latch is storing a "1" from a previous cycle. As indicated in the waveform diagram of FIG. 9, the first pulse is a reset pulse applied to the base of T26 through R25. The reset terminal is normally held negative normally keeping T26 off at all times. The reset is brought positive only when it is desired to reset. Since the set pulse will also reset this latching circuit in the absence of signal input current, the reset pulse need only be used under certain circumstances. The reset pulse is only necessary in an over-all system where a number of latch circuits have their data outputs connected in parallel. Using the reset pulse prevents a false reading from one of the other latch circuits.

The set pusle is normally applied to the base of T39 through R24, the set terminal being normally held at a positive level. When it is desired to store the state of an input pulse at the output, the set terminal is brought negative. This turns T39 off causing the base of T38 to be brought to the down level turning T38 off. Transistors T37 and T38 comprise a current switch. Transistors T41 and T42 display high collector impedance in the linear range so that a constant current flows into them. With T38 off, all the current in the current switch (T37 and T38) must pass through T37, this same current passing through either T23 and T24. When the input is at its threshold of 0.9 milliamps, the potential at points A and B is equal, and equal portions of the current pass through T23 and T24. Assume that a "1" is received at the input so that point A becomes more negative than point B. More of the constant current passing through T37 then must pass through T24 and R21 bringing the base of T28 to a down level. With T28 conducting less current, the base of T27 is brought to a down level, a voltage which is below the level of the base of T25. With T23 at a lowered current level and with T27 essentially off, the base of T30 will be brought to a higher potential level by virtue of the absence of current through R20. When T30 is thus turned on, the base of T31 and T32 are brought to an up level turning them on and providing a positive output. Such a positive output is indicative of a "1" as indicated in the waveform diagram. The two transistors T31 and T32 in parallel provide a high current output for large fan-out in subsequent circuits. In order to maintain the output at the "1" up level, the set pulse is now brought positive. This turns T39 on more which in turn turns T38 on as T37 is turned off. Since the base of T25 is at the highest potential of the bases of T25, T26 and T27, it will conduct and would bring the base of T28 to a low voltage level if it were not already at that point. At any rate, as long as the set pulse is maintained at a positive level T25 will continue to conduct causing the base of T27 to remain at a down level regardless of the state of the voltage differences at the bases of T23 and T24, and the output will therefore be preserved at an up level regardless of the fluctuations at the input.

Briefly, if a "0" is desired to be stored, then point A would be more positive than point B so that T23 would conduct. This brings the base of T30 to a down level bringing the base of T31 and T32 to a down level, thereby turning them off. The output will therefore be at some down level determined by components in subsequent circuitry, the said down level being an indication of a "0." With T23 conducting the greater share of the current, T24 tends to be off causing the base of T28 to be at an up level thereby bringing the base of T27 to an up level. Now, when the set pulse is brought positive, turning T38 on, T27 will conduct instead of T25 which was the case when a "1" was to be stored. When T27 conducts, the base of T30 is maintained at a down level maintaining the output from T31 and T32 at a down level.

Referring briefly back to FIG. 1, the details of obtaining the relative levels of point A and point B is described. Only the condition in the event of a "1" is described since the circuit being completely symmetrical the other binary state is self explanatory. With a "1" at the input, T1 conducts more current and the base of T11 is therefore brought more negative than the base of T12. The base of T11 is therefore more negative than the base of T12. Accordingly, the base of T20 is held at a lower level than the base of T21 causing point A to be at a lower level than point B.

Assuming that temperature variations and power supply variations are maintained within tight tolerance limits, the circuit will operate as described and perform its intended function. In the real world, however, the temperature and power supply compensation incorporated in the circuit lead to superior and more reliable operation. The circuit described herein compensates for four different types of variations including:

1. Variations in the monolithic memory array power supply (the +2 volt supply).
2. Effects of an increase in the temperature of the monolithic memory array.
3. Variations in the sense amplifier latch circuit power supply (−3 volt supply).
4. Variations in the temperature of the sense amplifier latch circuit. This variation, of course, occurs simultaneously with effect No. 2, i.e., the temperature variation of the monolithic memory array.

These will be described in the listed order. The effect of an increase in the +2 voltage supply of the monolithic array results in a higher current output for both a "1" and a "0", from the array. This would cause problems with sensing a "0" output since more than 0.2 milliamps would be drawn. In the extreme case, more than 0.2 milliamps would be drawn at the input of the sense amplifier latch, and a "0" would no longer be sensed with high speed. As a practical matter, in the presence of noise and device tolerances, it is necessary to draw somewhat less than 0.9 milliamps to indicate a "0." Now in the present circuit, it is desirable to maintain approximately 2 volts potential difference between the base of T1 and the base of T8. The reason for this will become more apparent in the discussion of the temperature compensation features. The point connected to the base of T8 is maintained at approximately +1.5 volts by the two diode drops of 750 millivolts each occassioned by T5 and T47 connected to ground. The base of T1 is maintained near 3.5 volts by the two 750 millivolt drops occasioned by series diodes T7 and T6 connected to the +2 volt supply. Note that this is the same +2 volt supply used by the monolithic memory array. Assuming that the power supply of the monolithic memory array increases slightly in the positive direction, then the base of T1 (and T2) will be brought slightly more positive. This causes T1 and T2 to conduct more current and since R3 and R4 are very low resistances compared to R1 and R2, the entire change in the +2 volt supply is seen across R1 and R2. To emphasize this voltage change in the +2 volt supply at the input node, R1 is made much greater than R2. This, however, necessitates the use of compensating circuitry comprising T8 and R26.

Figure 5:
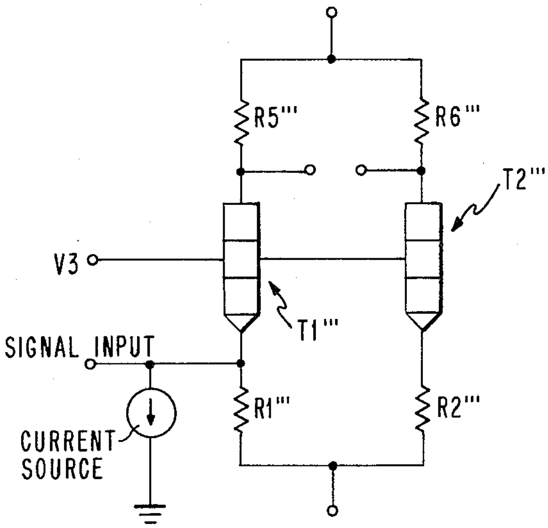
FIG. 5 is an equivalent circuit particularly illustrating the monolithic memory array power supply compensation feature.

Refer to FIG. 5 for a simplified circuit diagram in which the transistor T8 and R26 have been replaced by a current source. Components corresponding to those in FIG. 1 have been correspondingly numbered but triple primed to permit specific references. Assume component values as given in the table that is R1 = R1''', etc. The threshold of the system is still defined to be the condition when the differential voltage at the collectors of T1''' and T2''' is equal to zero. Assume initially that the current source is not connected. If the current through resistor R1''' is equal to 0.9 milliamps, then the current through resistor R2''' is equal to 1.8 milliamps. In order to bring the system to the threshold the signal must increase the emitter current of T1''' by 0.9 milliamps. As previously described as the 2 volt supply in the monolithic memory array increases the value of the "0" and "1" current levels also increases. Similarly, with reference to FIG. 1, as the two volt supply connected to T6 is increased the potential at the base of T1 is correspondingly increased. Note that the potential at the base of T1 is approximately 1.5 volts higher than the 2 volt supply based on a voltage drop of approximately 750 millivolts through each of the series diodes T7 and T6. Looking at FIG. 5 again, as the +2 voltage supply is increased, the threshold will increase by the following relationship:

$$\Delta \text{ threshold} = \Delta V3 \left(\frac{1}{R2'''} - \frac{1}{R1'''}\right)$$

V3 refers to the voltage at the base of T1'''. As can be seen from the above equation, to get large changes in the threshold for a given change in the potential at the base of T1''' both resistor R1''' and R2''' must be made small and the corresponding current large. For a memory sense amplifier, a small difference between two large currents is difficult to maintain. With further reference to the above equation, it is therefore seen that if R1''' is fixed at a first value and R2''' is made very large the following relationship is obtained:

$$\Delta \text{ threshold} = \Delta V3 \left(\frac{1}{R1'''} - 0\right) = \frac{V3}{R1'''}$$

Since the desired threshold current of the sense amplifier latch circuit is determined by the current levels coming from the monolithic array, in order to achieve the desired relationship the bias current in T1''' should not be dependent on the 2 volt supply alone. In order to obtain this result, the indicated current source is placed in parallel with R1''' and made independent of the 2 volt supply. By use of this current source for a given total current (the sum of the emitter currents of T1''' and T2'''), larger changes in the threshold as a function of the 2 volt supply (variations in the emitter voltage of T1''') are obtained. For a continuing explanation refer back to FIG. 1 for an implementation of the equivalent circuit of FIG. 5. As can be readily seen, the current source comprises grounded base transistor T8 (grounded through diodes T5 and T47) and a series resistor R26 to the −3 volt supply. By adjusting the values of R1 and R2, the desired sensitivity to the 2 volt supply as sensed at the base of T1 is achieved. The threshold current of the system is now equal to the sum of the currents through resistor R1 and the collector of T8 subtracted from the current through R2. In other words, the current through R2 is equal to the sum of the threshold current added to the current through R1 and the current through transistor T8.

As the temperature of the monolithic memory array increases there is an increase in the output current level of its output just as was occasioned by the increase in the +2 volt supply. There is of course also a change in the components of the sense amplifier latch circuit, since they share the same environment. As an approximate design criteria, as the temperature increases, the base to emitter voltage of the transistors and diodes decreases approximately 2 millivolts per degree centigrade. On the other hand, for each degree centigrade of temperature increase the resistors will increase in value by approximately 0.15 percent These characteristics of the components are the reason for the desirability of a 2 volt potential across R1 and R2. Since a 2 volt differential across a series diode resistor combination will maintain a constant current with temperature, the current through R1 and R2 would be expected to remain constant. However, the network composed of T8 and R26 has approximately 4.5 volts applied across it, resulting in a current decrease with an increase in temperature. In this case the resistor is the dominating current setting element. In a temperature range from 25° to 85° C the base to emitter voltage of T3 will decrease approximately 120 millivolts. At the same time the resistance of R26 will increase approximately 9 percent. Since the change in the resistor is the dominant change, the collector current of T8 will decrease 9 percent as the temperature is increased from 25° to 85° C. Also the voltage across R26 decreases 120 millivolts because of the net change in voltage drops across T5, T8, and T47. The current through T8 at 25° C is approximately 400 microamps. This temperature increase will therefore decrease the current by 36 microamps causing the threshold current of the sense amplifier to increase by 36 microamps. Although this is a relatively small increase in threshold current with temperature, it is at least a step in the right direction and precludes a decrease in threshold current which would be highly undesirable.

The addition of the transistor T8-resistor R26 series combination connected to the −3 volt supply also eliminates any change in threshold due to −3 volt supply variations in the monolithic current source T41, T43 and R17. The output of the latch is dependent on the current source composed of the transistor T41, T42, T43 and resistor R17. As the magnitude of the −3 volt supply is made more negative, the output at the emitters of transistor T31 and T32 becomes more negative, if uncompensated. A voltage increase in the −3 volt supply causes a greater current through T41 and T42 and hence through R20 (or R21). This tends to lower the potential at the base of T30, tending to lower the output potential. This is offset by increasing the potential at A to the point that all of the additional current through the monolithic current source passes through T24. The presence of the −3 volt supply at the T8–R26 series combination causes an increase in the emitter current of T1 which causes a voltage drop at point A which is the input to the base of T23 thereby decreasing the conductivity of T23 by just the correct amount to maintain a constant current in R20. This nominally eliminates the dependence of the threshold of the circuit on the −3 volt supply.

Figure 6:
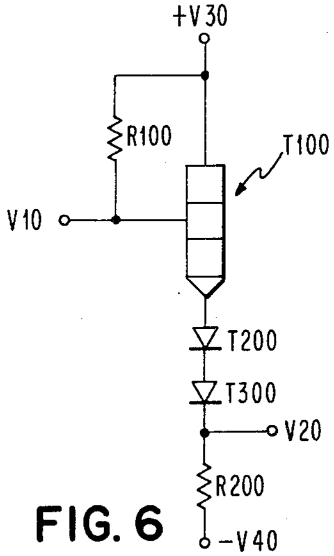
FIGS. 6, 7 and 8 are circuits particularly illustrating the temperature and output voltage compensation features of this invention.

Frequently in the process of designing monolithic circuits it is necessary to use strings of series diodes for level shifting and voltage referencing. This is evidenced in the present sense amplifier latch circuit, for example, at FIG. 1 where a string of diodes T13, T15, and T17 are used to shift from the level at emitter T11 to the base of T20. Similarly, diodes T14, T16 and T18 are used to shift the level at the emitter of T12 to a level at the base of T21. As a design parameter, it is frequently assumed that each diode shifts the level by approximately 750 millivolts. Accordingly, a string of three diodes in series will provide a level shift of approximately 3.25 volts. Other than diodes the normal base to emitter voltage drop of transistors produces an identical phenomenon for example, see FIG. 2 where from the base of T33 to the common connection between the emitters of T31 and T32, three levels of base to emitter voltage drop are encountered. As mentioned, the 750 millivolt drop is a useful design figure but actually there is a tolerance of plus or minus 50 millivolts that must be taken into consideration. Thus, the base to emitter voltage drop (or a drop across a diode) may vary from 700 millivolts to 800 millivolts). When three such diode junctions are placed in series the tolerance becomes plus or minus 150 millivolts. This seriously limits the number of diodes which may be placed in series without reaching the point of indeterminable voltage levels at the output. As an example, consider the circuit of FIG. 6 which shows a typical level shifting arrangement from the potential at V10 to the potential at V20. Note that there are three base to emitter voltage drops from the base of T100 through diode T200 and diode T300. In this configuration, predictably the voltage would be approximately 2.1 to 2.4 volts less at V20 than at V10. These figures, however, assume a constant temperature. Since each diode (or transistor base to emitter) experiences a decrease of voltage of approximately 2 millivolts per degree centigrade increase, there is an additional tolerance of 6 millivolts per degree centigrade at V20 in the circuit of FIG. 6. Therefore, going from 25° to 85° C the temperature tolerance of V2 will be another 360 millivolts.

Figure 7:
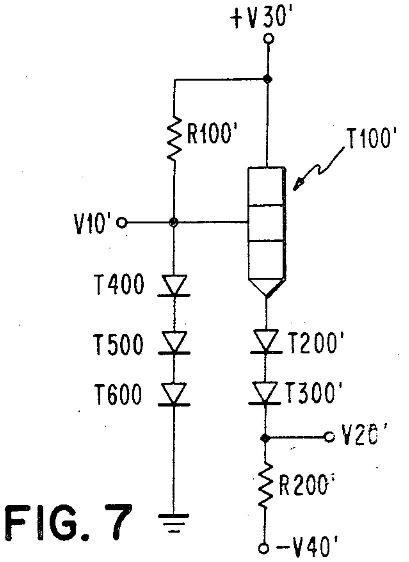

A technique for improving the tolerance of a circuit of this type is illustrated in FIG. 7. The circuit of FIG. 7 eliminates tolerances due to temperature. A string of diodes is attached to the base of T100′ equal to the number of base to emitter voltage drops to the output. Since the temperature of all components varies by approximately the same amount, the base to emitter voltage of the transistor in all diodes will vary the same amount and in the same direction. Therefore, as the potential at V20′ would normally increase with an increase in temperature due to a drop in the base-emitter voltages, in the circuit of FIG. 7 it remains constant. This constant voltage output is provided by the string of diodes which will also have a decrease in the base to emitter voltage drop with an increase in temperature. This increase in the voltage drop of the string of diodes will apply a lower potential to the base of T100′ offsetting the effect of the lower base to emitter voltage in T100′, T200′ and T300′. One way of looking at this situation is that T400 balances T100′. T500 balances the temperature effects of T200′ and T600 does the same for T300′.

Figure 8:
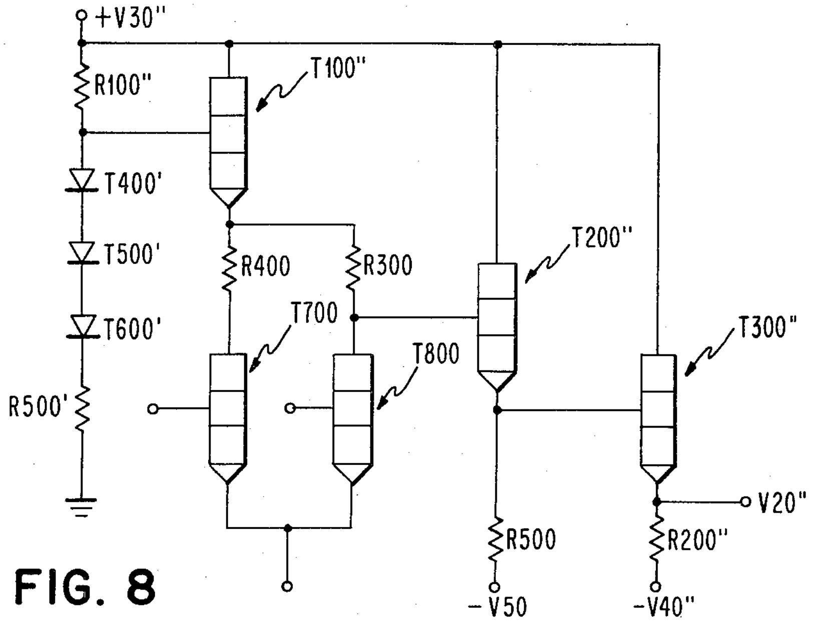

As previously mentioned, it frequently becomes necessary to shift signals from one voltage to another. Such a situation is shown in FIG. 8 where the output of the collector of T800 is desired as a circuit output at V20″. T100′ is a power source and always on. When T200′ and T300′ are also on, the voltage at V20″ is determined by the combination of the base to emitter voltage drops of T100″, T200″ and T300″ as referenced to the voltage at the base of T100″. The voltage at V20″ would therefore suffer from the tolerance and temperature difficulties just described. The addition of the series diodes T400′, T500′ and T600′ compensates for these tolerance and temperature variations.

The circuit of FIG. 8 can be related to the circuit of FIG. 2 where a similar scheme is employed to maintain the output level relatively constant with variations in the actual values of the components and changes in temperature. The series diodes T34, T35 and T36 effect the level at the base of T33 compensating for the base to emitter voltage drops through T33, T30 and T31.

What has been described therefore is a sense amplifier latch circuit for monolithic memories. This circuit includes low impedance input means in the presence of bi-polar noise current. It further includes threshold tracking, temperature compensating and power supply compensating circuits. The input means essentially includes a grounded base stage including transistors T1 and T2, clamping diode T3 and biasing resistors R1 and R2. A differential circuit having its input at the base of T11 and T12 is connected to the output of the input means. The output of the differential circuit is taken from the emitters of T20 and T21 at points A and B respectively. The temperature and power supply (−3 volt) compensating is primarily achieved by a current source including T8 and R26 connected at the input node. Variations in the output of the monolithic memory array due to temperatures are compensated as long as all circuits experience similar temperature changes. The current source comprised of T8 and R26 conducts less current with an increase in temperature. This temperature compensating current source is connected to the same power supply as the latching circuit, thereby also compensating for fluctuations in the −3 volt supply. Additional temperature compensation is achieved by series diodes as exemplified by T34, T35 and T36. To compensate for fluctuations in the monolithic memory array power supply (+2 volts), these fluctuations are also impressed across R1 and R2. Since R1 has a greater resistance value than R2, a positive increase in the +2 volt supply causes an increase in the differential voltage between points A and B. This effectively increases the threshold current of the sense amplifier latch circuit input, to compensate for the increased signal current from the monolithic memory array. The use of T8 and R26 at the input node permits a larger ratio between R1 and R2, resulting in a larger differential voltage variation at points A and B in response to variations in the +2 volt power supply. This is possible because the current through the collector of T8 and R26 is independent of the +2 volt supply.

While the invention has been particularly shown and described with reference to preferred embodiments thereof, it will be understood by those skilled in the art that various changes in form and details may be made therein without departing from the spirit and scope of the invention.

What is claimed is:

1. A sense amplifier latching circuit for accepting data signals from a monolithic memory array comprising:

an input node;

an output node;

input means having a low impedance and connected to said input node, said input means being biased to a threshold current level;

differential circuit means connected to the output of said input means;

latching means connected to the output of said differential circuit means for providing an output at said output node and holding the signal at said output node at a set level regardless of subsequent variations in the signal at the input node;

a source of power connected to said latching means, such that fluctuations in the potential of said power source tend to cause corresponding fluctuations in the potential level of the output; and a current source connected between the input node and the said same power supply, said current source adjusting the threshold current at the input node thereby varying the output of said differential circuit means, compensating for fluctuations in said power supply and maintaining the potential at the output node at a constant level in the presence of such fluctuations.

2. A circuit as in claim 1 wherein said power supply compensating means is a variable current source.

3. A circuit as in claim 1 wherein said current source comprises:

a transistor having collector, base and emitter regions, the collector being connected to the input node, the base being connected to an impedance in said input means; and a resistor connected between the emitter of said transistor and the said same power supply.

4. In a sense amplifier latching circuit for accepting data signals from a monolithic memory array, and having a low impedance input means biased to a threshold current level, the means for biasing including a pair of resistors with significantly different resistance values, said data signals from said monolithic memory array changing with variations in the power supply of said monolithic memory array, the improvement comprising:

a current source connected to said input means for providing greater variation in the threshold current level in response to a given fluctuation in the monolithic memory array power supply, thereby minimizing the effect of input signal variations caused by fluctuations in the power supply of the monolithic memory array;

said current source being a transistor including collector, base and emitter region and having its collector region connected to the input node, its base region connected to an impedance means; and impedance means connected to the emitter of said transistor and also connected to a source of potential.

* * * * *